United States Patent
Franke

(10) Patent No.: US 11,367,931 B2
(45) Date of Patent: Jun. 21, 2022

(54) METHOD FOR PRODUCING A CELL-CONTACTING SYSTEM FOR A BATTERY MODULE OF A VEHICLE, CELL-CONTACTING SYSTEM AND BATTERY MODULE

(71) Applicant: Bayerische Motoren Werke Aktiengesellschaft, Munich (DE)

(72) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/429,738

(22) PCT Filed: Mar. 12, 2020

(86) PCT No.: PCT/EP2020/056629
§ 371 (c)(1),
(2) Date: Aug. 10, 2021

(87) PCT Pub. No.: WO2020/212030
PCT Pub. Date: Oct. 22, 2020

(65) Prior Publication Data
US 2022/0045406 A1 Feb. 10, 2022

(30) Foreign Application Priority Data
Apr. 16, 2019 (DE) .................... 10 2019 110 008.9

(51) Int. Cl.
*H01M 50/503* (2021.01)
*H01M 50/249* (2021.01)
*H01M 50/204* (2021.01)

(52) U.S. Cl.
CPC ....... *H01M 50/503* (2021.01); *H01M 50/204* (2021.01); *H01M 50/249* (2021.01); *H01M 2220/20* (2013.01)

(58) Field of Classification Search
CPC . H01M 50/204; H01M 50/249; H01M 50/503
See application file for complete search history.

(56) References Cited

U.S. PATENT DOCUMENTS

2009/0318037 A1 12/2009 Wirth
2016/0043448 A1 2/2016 Fritz
(Continued)

FOREIGN PATENT DOCUMENTS

DE   10 2009 058 723 A1   6/2011
DE   10 2013 207 356 A1   10/2014
(Continued)

OTHER PUBLICATIONS

International Search Report (PCT/ISA/210) issued in PCT Application No. PCT/EP2020/056629 dated Jul. 30, 2020 with English translation (four (4) pages).
(Continued)

*Primary Examiner* — Jonathan G Jelsma
(74) *Attorney, Agent, or Firm* — Crowell & Moring LLP

(57) ABSTRACT

A method for producing a cell-contacting system for a battery module of a vehicle includes providing a plurality of connection elements for corresponding electrical connection of adjacent battery cells of the battery module, wherein the corresponding connection elements are produced such that they include a region having reduced stiffness; and providing a holding device for holding the connection elements, wherein the holding device is provided by electrically insulating support elements, initially at least one main body is provided and is connected to the support elements, and subsequently the connection elements are produced from the at least one main body.

9 Claims, 2 Drawing Sheets

(56) References Cited

U.S. PATENT DOCUMENTS

| | | |
|---|---|---|
| 2016/0268579 A1* | 9/2016 | Ichikawa .............. H01M 50/502 |
| 2016/0351883 A1 | 12/2016 | Lemke et al. |
| 2017/0179459 A1 | 6/2017 | Sato et al. |
| 2019/0296315 A1 | 9/2019 | Reimer et al. |

FOREIGN PATENT DOCUMENTS

| | | |
|---|---|---|
| DE | 10 2015 210 035 A1 | 12/2016 |
| DE | 10 2016 225 260 A1 | 6/2017 |
| DE | 10 2016 223 464 A1 | 5/2018 |
| EP | 2 080 232 B1 | 5/2016 |
| WO | WO 2016/028791 A1 | 2/2016 |

OTHER PUBLICATIONS

German-language Written Opinion (PCT/ISA/237) issued in PCT Application No. PCT/EP2020/056629 dated Jul. 30, 2020 (five (5) pages).

German-language Office Action issued in German Application No. 10 2019 110 008.9 dated Feb. 21, 2020 with English translation (13 pages).

Cover Page of EP 3183763 A1 published Jun. 28, 2017 (one (1) page).

German-language Decision to Grant issued in File Reference 10 2019 110 008.9, dated Aug. 21, 2020 with English translation (10 pages).

* cited by examiner

METHOD FOR PRODUCING A CELL-CONTACTING SYSTEM FOR A BATTERY MODULE OF A VEHICLE, CELL-CONTACTING SYSTEM AND BATTERY MODULE

BACKGROUND AND SUMMARY OF THE INVENTION

The present invention relates to a method for producing a cell-contacting system for a battery module of a vehicle. Here, a plurality of connection elements are produced for respective electrical connection of adjacent battery cells of the battery module. The respective connection elements are produced such that they comprise a region having reduced stiffness. Also provided is a holding device for holding the connection elements. Furthermore, the present invention relates to a cell-contacting system and a battery module.

Electrical stores or battery modules for vehicles are provided by the interconnection of multiple battery cells. In particular in the case of lithium-ion stores, the device needed for the purpose is generally designated as a cell-contacting system. Such a cell-contacting system comprises a plurality of connection elements, which are used to connect battery cells electrically to one another. The prior art discloses connection elements which are provided with a bent portion reducing the stiffness. In addition, the cell-contacting system normally comprises respective external connection elements or connection elements directed toward the outside for the connection with the external contact-making component of the cell assembly. In addition, a holding device or an assembly frame for the simple placing and mounting of the connection elements on the cell assembly is usually provided. In addition, sensors and signal lines having an interface to a logic wiring harness can be arranged on this holding device. If appropriate, this arrangement is supplemented by electronic circuits, which include the monitoring of the cell voltages and the temperature and also the preparation of signals required for logging. According to the prior art, the individual parts of the cell-contacting system are prefabricated and joined in a final mounting process.

The multiplicity of technologies used in such a cell-contacting system involves a high level of complexity of production, combined with high costs. One of the key factors here is the prefabrication of the connection elements between the battery cells with the bent portion that reduces the stiffness. These connection elements can have a different shape within the cell-contacting system and likewise differ in cell-contacting systems for different cell assemblies. For example, the connection elements can consist of a strip-like main body or initial material which is punched, bent and separated in a multi-stage process and then fed in a sequenced manner to the mounting in the assembly frame. Because of the bent portion reducing the stiffness, it is not possible to pre-punch the connection elements belonging to a cell-contacting system in the assembly and to separate them only with the mounting in the assembly frame. The assembly frame primarily has the function of fixing the position of the connection elements, the external contacts and the further elements relative to one another until they are mounted on the cell assembly. Following the mounting of the cell-contacting system on the cell assembly, this function is dispensed with, although the assembly frame is retained in the application.

Furthermore, the prior art discloses further cell connectors which have a region with reduced stiffness. For example, EP 2 080 232 B1 discloses a cell connector in flat form for making electrical contact with at least two flat power sources. In the cell connector, a connection cross section is divided into lamellar structures which, for example, can have S-shaped incisions. In this way, for example, the flexural rigidity can be reduced.

The object of the present invention is to indicate a solution as to how a cell-contacting system of the type mentioned at the beginning can be produced with less effort and more cost-effectively.

According to the invention, this object is achieved by a method, by a cell-contacting system and by a battery module having the features according to the claimed invention.

A method according to embodiments of the invention is used to produce a cell-contacting system for a battery module of a vehicle. Here, a plurality of connection elements are produced for respective electrical connection of adjacent battery cells of the battery module. The respective connection elements are produced such that they comprise a region having reduced stiffness. Furthermore, a holding device for holding the connection elements is provided. Embodiments of the invention provide for the holding device to be provided by electrically insulating support elements, initially at least a main body is produced and is connected to the support elements and then the connection elements are produced from the at least one main body.

The cell-contacting system for the battery module is intended to be produced by using the method. The cell-contacting system is therefore used to connect a plurality of battery cells electrically to one another to form the battery module. Furthermore, provision can be made for a plurality of such battery modules in turn to be connected to form a battery or high-voltage battery of the vehicle. The battery modules or such a battery is used to supply electrical energy to an electric drive motor of a vehicle at least partly driven with electrical energy. The cell-contacting system comprises a plurality of connection elements. These connection elements are used to connect the battery cells electrically to one another. For example, the connection elements can be used to connect the respective battery cells electrically in series. The connection elements can be produced from an electrically conductive material, for example a metal. In particular, the connection elements can be produced from aluminum, copper or a respective alloy. The holding device of the cell-contacting system is used to hold the connection elements in predetermined positions. Thus the connection elements can be connected to the battery cells, with the result that the desired electrical interconnection of the battery cells is made possible.

According to an important aspect of the invention, provision is made for the holding device to be provided by electrically insulating support elements. In other words, the holding device therefore has the electrically insulating support elements. These support elements can be designed in particular in the form of strips or bands. The support elements are produced from an electrically nonconductive material, for example from a dimensionally stable plastic or a fiber composite material. Such a holding device and the support elements can thus be provided cost-effectively and in addition offer the advantage of good recyclability. At least one main body is attached to these support elements. Provision can also be made for multiple main bodies to be attached to the support elements. This main body, which can also be designated as an initial material, can be single-layer or multi-layer. The connection elements are then produced from this at least one main body. The main body can likewise be designed in the form of a strip and connected to the electrically insulating support elements. The main body can be a metal sheet or sheet metal strip. The main body can be provided rolled up on a roll. Following the connection of the at least one main body to the support elements, the connection elements are produced from the at least one main body. To produce the respective connection elements from the at least one main body, an appropriate separation process, for example punching, can be used. If the connection elements are produced by punching from the main body, the result is the advantage that the connection elements can be produced simultaneously. Provision can also be made for the connection elements to be produced by machining or laser cutting. Those parts of the at least one main body which are not needed for the production of the connection elements can be removed. The production of the connection elements and the connection of the support elements to the main body is carried out in such a way that, following the production of the connection elements, the respective connection elements are held on the support element. Therefore, the connection elements and thus the cell-contacting system can be produced within a short time period and with low costs.

Preferably, to provide the region having the reduced stiffness of the respective connection elements, a plurality of cut-outs is introduced into the at least one main body. Provision is therefore made to provide the reduction in the stiffness of the connection elements by a structure which is introduced flat, preferably punched in, which replaces the bent portion known from the prior art. During the production of the respective connection elements, the cut-outs are also introduced into the same. For example, appropriate passage openings can be introduced into the material. This structure can consist of offset slots, as in an expanded metal. The cut-outs can in particular have the form of elongated slots. Provision can also be made for the cut-outs to have at least two regions which enclose an obtuse angle. The cut-outs can also have an undulating design. Provision can also be made for the cut-outs to be arcuate, S-shaped or the like. In principle, the cut-outs can be arranged parallel to one another. As a result of the introduction of the plurality of cut-outs into the main body and the connection elements, the region having the reduced mechanical stiffness can be produced in a straightforward way. The region having the reduced stiffness, as compared with the remaining regions of the connection element, can have a lower mechanical stiffness, in particular a lower flexural rigidity. By way of the region of reduced stiffness, following the connection of the connection elements to the battery cells, mechanical forces and stresses resulting from temperature differences or the like can be compensated for. In addition, by way of the cut-outs, it is possible to dispense with bending the connection elements, which means that the production steps are reduced considerably and thus costs can be saved.

In one embodiment, the cut-outs are introduced into the at least one main body in such a way that these extend substantially along a predetermined current flow direction of a current flow between the adjacent battery cells. The respective connection elements can have two contact-making regions. The first contact-making region can be connected electrically to a terminal or pole of a first battery cell. The second contact-making region can be connected to the terminal or pole of a second, adjacent battery cell. The region having the reduced stiffness can be located between the two contact-making regions. The direction of the current flow results substantially from the first contact-making region to the second contact-making region. The respective cut-outs can be formed as elongated slots, which extend substantially along the current flow direction. The respective cut-outs can also have a predetermined angle to the current flow direction. Lands, through which the current flow takes place, remain between the respective cut-outs. As a result of this configuration, firstly the reduced mechanical stiffness can be achieved and, secondly, the current flow between the adjacent battery cells can be ensured.

It is also advantageous if the at least one main body is structured in such a way that the respective connection elements are separated electrically from one another. The individual connection elements can be separated from the main body which, for example, can be provided as a strip-like metal layer or as a metal sheet. The connection elements are produced in such a way that they are separated electrically from one another following production and are spaced apart from one another. The structuring of the main body is carried out in such a way that the respective connection elements are separated from the main body at previously defined positions. Thus, these are located at the desired positions in order to produce the desired electrical connection between the battery cells when making contact with the battery cells.

In a further refinement, external connection elements for providing an electrical connection to external contacts of the battery module are produced from the at least one main body. For example, the cell-connecting system can have two external connection elements. These can be connected electrically to the external contacts of the battery module or the poles of the battery module. As a result, the respective external connection elements can each be connected to a terminal of one of the battery cells. During the structuring of the at least one main body, therefore, firstly the connection elements and secondly the external connection elements can be produced jointly, so that all these contacts are defined relative to one another in their subsequent mounting position. The external contacts can then be joined appropriately to the external contact elements and, if appropriate, likewise connected mechanically to the support elements. To this end, for example, screw connections, adhesive connections, welded connections, clamp connections or the like can be used. This simplifies the effort during the production of the cell-contacting system and additionally reduces the costs.

In a further embodiment, it is possible to dispense with an electrical and/or mechanical connection of the connection elements to the external contacts of the battery module. The respective cell assemblies or battery modules can then be connected electrically directly to one another via the external connection elements. The electrical contact between the external connection elements of battery modules which are to be connected electrically to one another can be produced by clamping, welding or the like. It is thus possible to dispense with additional components, and thus installation space can be saved.

In a further embodiment, an adhesive is used to connect the at least one main body to the support element. It is therefore possible to use an appropriate adhesive method in order to connect the at least one main body to the support elements. Furthermore, provision can be made for the support elements to be partly melted, at least in some regions. The respective support elements can therefore be partly melted, at least locally, and then connected to the at least one main body. Following the hardening or solidification of the respective support elements, the mechanical connection between the main body and the support elements is then produced. Provision can also be made for the respective support elements to be provided by way of an extrusion process. Here, the material for the production of the support elements can be applied in the liquid state to the at least one main body and then hardened. Furthermore, provision can also be made for the support elements to be produced by lamination. Here, the mechanical connection between the at least one main body and the support elements can be provided. As already explained, the support elements can be designed in the form of a strip or band. The main body can also be designed in the form of a strip. The support elements can in particular be attached in an upper edge and in a lower edge of the main body. In principle, multiple main bodies can also be connected to multiple support elements. Overall, this permits simple and cost-effective production.

Preferably, the connection elements are produced in such a way that these are arranged above one another in a first row and in a second row, and that the adjacent battery cells can be connected to one another alternately in the first row and the second row. In the first row, the connection elements can be arranged beside one another at a distance along a longitudinal direction of the cell-connecting system. The second row, in which the connection elements are likewise arranged beside one another at a distance, can be located beside the first row with respect to a transverse direction of the cell-connecting system. The connection elements in the first row can be arranged to be offset relative to the connection elements in the second row. The respective battery cells can be arranged parallel to one another along a transverse direction of the cell-connecting system. In the first row, a terminal of the first battery cell can then be connected to the terminal of a second battery cell by the first connection element. In the second row, the other terminal or pole of the second battery cell can be connected to a terminal of a third battery cell. This sequence can be continued correspondingly. The result is thus the alternating connection. In addition, the external connection elements can then be provided in the second row. Thus, overall, a compact arrangement of the battery cells relative to one another can be achieved.

In a further embodiment, the support elements are provided in such a way that a first support element is connected to a respective upper side of the connection elements in the first row, a second support element is connected to a respective underside of the connection elements in the first row and to a respective upper side of the connection elements in the second row, and a third connection element is connected to the respective underside of the connection elements and the second row. In the above-described arrangement, in which the connection elements are provided in two rows arranged beside one another, the first support element, the second support element and the third support element can be provided as the support elements. The respective upper sides of the connection elements from the first row are held on the first support element. The respective undersides of the connection elements from the second row are held on the third support element. Both the undersides of the respective connection elements of the first row and the upper sides of the respective connection elements in the second row are fixed to the second or central support element. This configuration can guarantee that the connection elements are held in the desired positions and can thus be connected to the battery cells.

Further elements of the battery module, such as sensors, monitoring devices, communication devices or the like, can be mounted on the pre-fabricated cell-contacting system. It is likewise possible to perform this mounting before the mounting of the external contacts or only after the prefabricated cell-contacting system has been mounted on the cell assembly.

A cell-contacting system according to embodiments of the invention for a battery module of a vehicle comprises a plurality of connection elements for the respective electrical connection of adjacent battery cells of the battery module, wherein the respective connection elements have a region having reduced stiffness. In addition, the cell-contacting system comprises a holding device for holding the connection elements. The holding device comprises electrically insulating support elements, and the connection elements are produced from at least one main body connected to the support elements.

A battery module according to embodiments of the invention for a vehicle comprises a cell-contacting system according to the invention and a plurality of battery cells, which are connected electrically to one another by the connection elements of the cell-contacting system. The battery module can also be designated as a cell assembly.

A vehicle according to embodiments of the invention comprises a battery module according to the invention. The vehicle can also comprise multiple battery modules, which are connected to form one battery. This battery can also be designated as a high-voltage battery or as a traction battery. The vehicle can be an electric vehicle or a hybrid vehicle. The vehicle can also preferably be formed as a passenger car.

The preferred embodiments presented with reference to the method according to the invention and their advantages apply accordingly to the cell-contacting system according to the invention, to the battery module according to the invention and to the vehicle according to the invention.

Further features of the invention emerge from the claims, the figures and the figure description. The features and feature combinations mentioned above in the description and the features and feature combinations mentioned below in the figure description and/or shown on their own in the figures can be used not only in the respectively specified combination but also in other combinations or on their own.

The invention will now be explained in more detail by using a preferred exemplary embodiment and with reference to the drawings.

DETAILED DESCRIPTION OF THE DRAWINGS

In the figures, identical or functionally identical elements are provided with the same designations.

Figure 1:
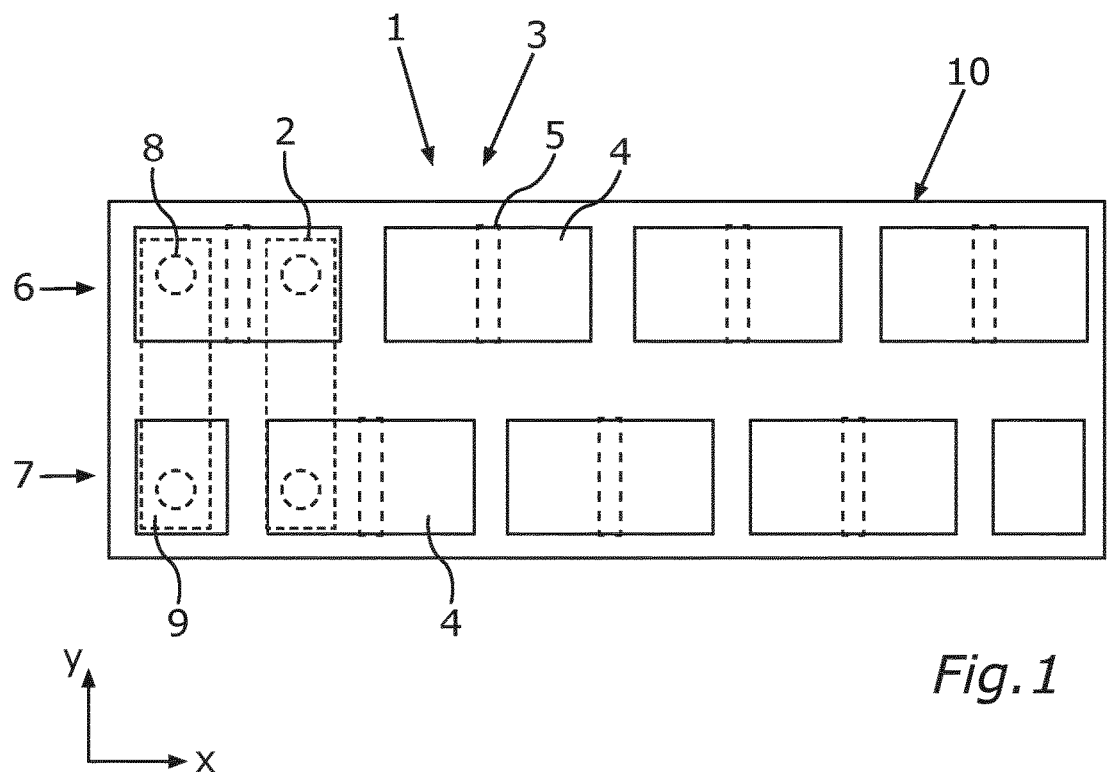
FIG. 1 shows a battery module having a cell-contacting system according to the prior art in a schematic illustration.

FIG. 1 shows a battery module 1 for a vehicle in a schematic illustration. This battery module 1 can be part of a battery of the vehicle, wherein the battery is able to supply a drive motor of the vehicle with electrical energy. The battery module 1 comprises a plurality of battery cells 2, of which two battery cells 2 are indicated in the present case. Furthermore, the battery module 1 comprises a cell-contacting system 3. The cell-contacting system 3 in turn comprises a plurality of connection elements 4. As explained in more detail below, the connection elements 4 are used for the electrical connection of the respective battery cells 2.

The respective connection elements 4 are produced from an electrically conductive material, for example a metal. The respective connection elements 4 have a region 5 having reduced stiffness. According to the prior art, the region 5 having reduced stiffness is produced by appropriately bending the connection element 4. In the present case, the connection elements 4 are arranged in a first row 6 and a second row 7. The connection elements 4 in the first row 6 and in the second row 7 are arranged beside one another and at a distance from one another along a longitudinal direction x of the cell-contacting system 3. In the first row 6, by using the first connection element 4 on the left-hand side, the respective terminals 8 of the adjacent battery cells 2 can be connected electrically to one another. By using the connection element 4 in the second row 7, the second battery cell 2 can then be connected to a third battery cell 2, not illustrated. Overall, the respective battery cells 2 can thus be connected electrically in series by way of the connection elements 4. Furthermore, the cell-contacting system 3 comprises external connection elements 9, which can be connected to external contacts of the battery module 1.

Figure 2:
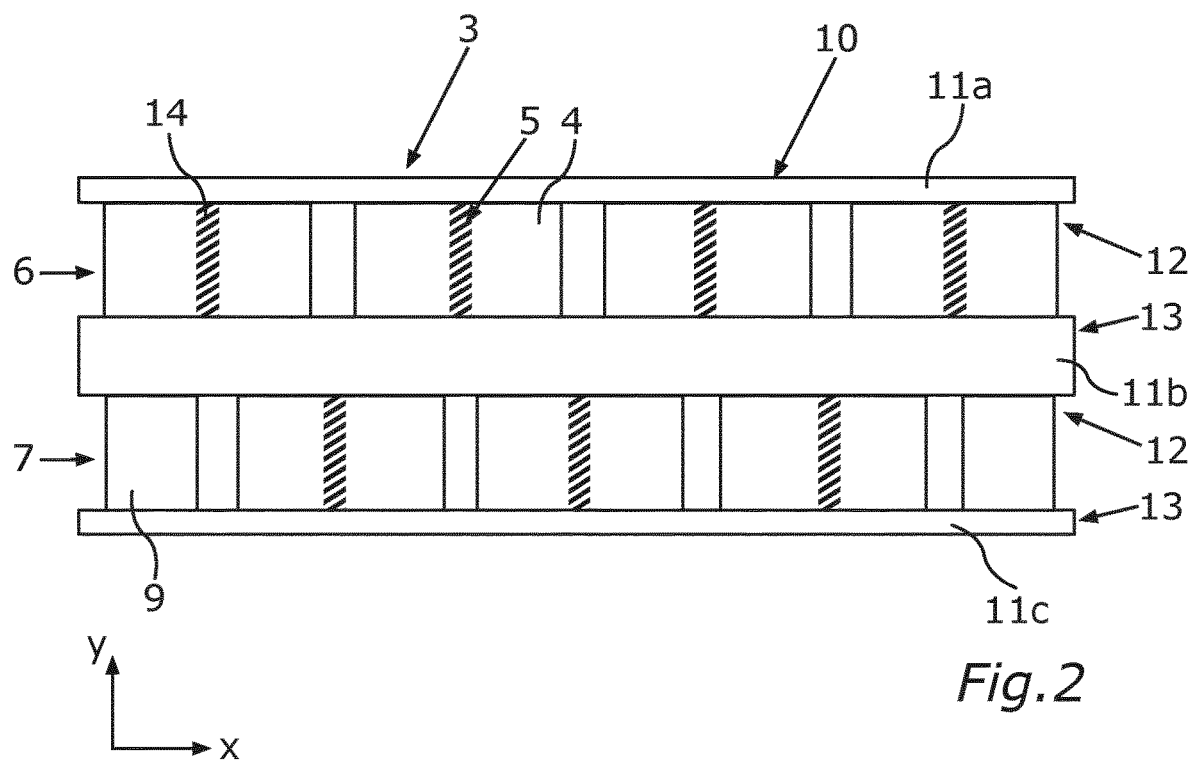
FIG. 2 shows a cell-contacting system according to one embodiment in a schematic illustration, wherein the cell-contacting system has a plurality of connection elements and support elements.
Figure 3:
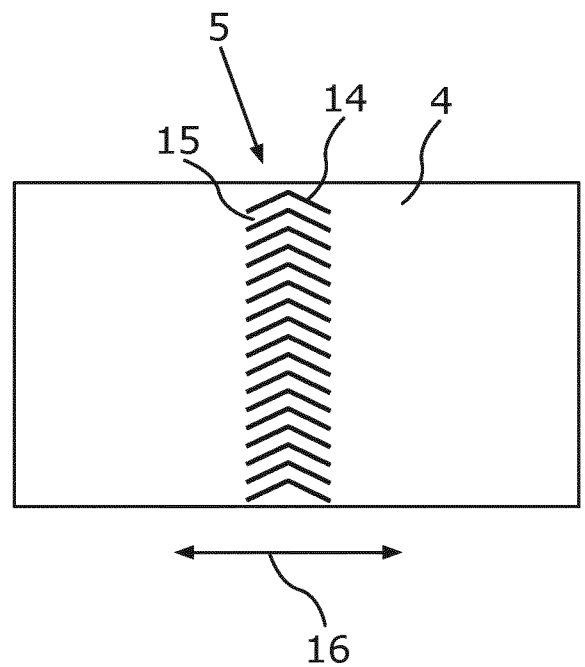
FIG. 3 shows a connection element according to a further embodiment.

In addition, the cell-contacting system 3 comprises a holding device 10, which is used to hold the respective connection elements 4 and the external connection elements 9. In the present example, the holding device 10 is formed as an assembly frame. During the production of the cell-contacting system 3, the respective connection elements 4 are punched, bent and separated from a main body or initial material in a multi-stage process. Following this, the connection elements 4 produced can be fixed to the holding device 10 or the assembly frame. As a result, multiple production and mounting steps are needed FIG. 2 shows a cell-contacting system 3 according to a first embodiment. This cell-contacting system 3 also has the plurality of connection elements 4, which, analogous to the cell-contacting system 3 according to FIG. 1, are arranged in the first row 6 and the second row 7. This cell-contacting system 3 also comprises the external connection elements 9. In the present case, the holding device 10 is formed by multiple support elements 11a, 11b and 11c. These support elements 11a, 11b, 11c are formed from an electrically nonconductive material, for example a plastic or a fiber composite material.

For the production of the connection elements 4, a main body or initial material is provided. This main body can be designed in the form of a strip or as an elongated metal sheet. For the production of the connection elements 4 which are arranged in the two rows 6, 7, two main bodies can be used. A first main body for the production of the connection elements 4 in the first row 6 can be connected to the first support element 11a and the second support element 11b. For the production of the connection elements 4 in the second row 7, a main body can be connected to the second support element 11b and the third support element 11c. Adhesive bonding or a partial melting process can be used as a connecting method for the connection between the base material and the support elements 11a, 11b and 11c. Provision can also be made for a material for the production of the support elements 11a, 11b and 11c to be extruded or laminated.

In order to produce the respective connection elements 4, a separating method, such as for example punching, milling or laser cutting, can be used. Here, the respective connection elements 4 are separated from the main body in such a way that the connection elements 4 can remain at predefined positions. In addition, the connection elements 4 are produced such that respective upper sides 12 of the connection elements 4 in the first row 6 remain connected to the first support element 11a, and the respective undersides 13 of the connection elements 4 in the first row 6 remain connected to the second support element 11b. Furthermore, the upper sides 12 of the connection elements 4 in the second row 7 remain connected to the second support element 11b, and the undersides 13 of the connection elements 4 in the second row 7 remain connected to the third support element 11c. In the present case, the second support element 11b, as compared with the first support element 11a and the third support element 11c, has a greater width in relation to a transverse direction y of the cell-contacting system 3, in order to ensure the connection to the connection elements 4 in both rows 6, 7.

In the same way, the external connection elements 9 are likewise separated from the main body during the production of the connection elements 4. In the present case, the regions 5 in which the connection elements 4 have reduced stiffness are formed by appropriate cut-outs 14. In the present case, these cut-outs 14 are formed as elongated slots. These cut-outs 14 extend parallel to one another. These cut-outs are likewise produced during the production of the connection elements 4 and the external connection elements 9.

As described previously in connection with FIG. 1, the battery cells 2 can be connected to one another by way of the connection elements 4. By way of the production method, the sequenced provision of the individual connection elements 4 for the cell-contacting system 3 and the pre-assembly of the connection elements 4 are dispensed with. The replacement of the bent portion by planar structures for the reduction in the stiffness of the connection elements 4 also permits dimensionally-neutral separation of the connection elements 4. In addition, provisions for indentations during punching are omitted. The use of material is additionally reduced. With the replacement of the bent portion by the planar structures for the reduction in the stiffness, the overall height of the cell-contacting system 3 can be reduced. This thus increases the installation space that can be used for the energy storage.

Figure 4:
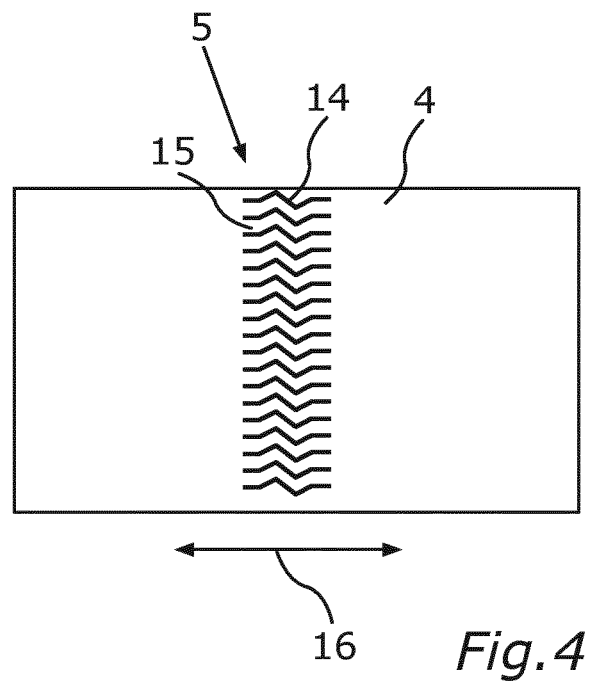
FIG. 4 shows a connection element according to a further embodiment.

FIG. 4 shows a connection element according to a further embodiment. Here, the cut-outs 14 have two regions, which enclose an obtuse angle with each other. In the example according to FIG. 4, which shows a connection element 4 according to a further embodiment, the cut-outs 14 have a plurality of regions which extend in an undulating manner. The remaining lands 15 between the cut-outs 14 extend substantially along a current flow direction 16. The current flow direction 16 describes the direction of the current flow between the adjacent battery cells 2. Given appropriate dimensioning of the cut-outs 14 for reducing the stiffness, the remaining current-carrying lands 15 act as fuses in the event of damage and permit the selective disconnection of the current path in the surroundings of a short-circuited battery cell 2. Thus, personal safety in the event of an accident can be increased.

LIST OF DESIGNATIONS

1 Battery module
2 Battery cell
3 Cell-contacting system
4 Connection elements
5 Region
6 First row
7 Second row
9 External connection elements 10 Holding device
11a, 11b, 11c Support element
12 Upper sides
13 Undersides
14 Cut-outs
15 Land
16 Current flow direction
x Longitudinal direction
y Transverse direction

What is claimed is:

1. A method for producing a cell-contacting system for a battery module of a vehicle, the method comprising:
   producing a plurality of connection elements for respective electrical connection of adjacent battery cells of the battery module, and
   providing a holding device for holding the connection elements, wherein:
   each of the connection elements is produced such that the connection element has a region having a reduced stiffness, wherein the region having the reduced stiffness has a lower mechanical stiffness in comparison with other regions of the connection element,
   the connection elements are produced such that the connection elements are arranged beside one another in a first row and a second row, an upper side of the second row is arranged opposite to an underside of the first row, and the adjacent battery cells are connectable to one another alternately in the first row and the second row,
   the holding device is provided by electrically insulating support elements,
   a first main body formed as a strip or as an elongated metal sheet for production of the connection elements in the first row is connected to an underside of a first support element of the support elements and to an upper side a second support element of the support elements,
   a second main body formed as a strip or as an elongated metal sheet for the production of the connection elements in the second row is connected to an underside of the second support element and to an upperside of a third support element of the support elements, and
   initially the first main body and the second main body are provided and are connected to the support elements, and then the connection elements are produced from the first main body and the second main body.

2. The method according to claim 1, wherein the connection elements are produced from the first main body and the second main body by a separating method, punching, machining or laser cutting.

3. The method according to claim 1, wherein:
   to provide the region having the reduced stiffness of the respective connection elements, a plurality of cut-outs is introduced into the first main body and the second main body.

4. The method according to claim 3, wherein:
   the cut-outs are introduced into the first main body and the second main body such that the cut-outs extend substantially along a predetermined current flow direction of a current flow between the adjacent battery cells.

5. The method according to claim 1, wherein:
   the first main body and the second main body are structured such that the respective connection elements are separated electrically from one another.

6. The method according to claim 1, wherein:
   external connection elements for providing an electrical connection to external contacts of the battery module are additionally produced from the first main body and the second main body.

7. The method according to claim 1, wherein:
   to connect the first main body and the second main body to the support elements, at least one of:
   an adhesive is used,
   the support elements are melted, at least in some regions, or
   a base material for producing the support elements is applied to the at least one main body.

8. A cell-contacting system for a battery module of a vehicle, the cell-contracting system comprising:
   a plurality of connection elements for respective electrical connection of adjacent battery cells of the battery module, wherein each of the connection elements has a region having reduced stiffness, and the region having the reduced stiffness has a lower mechanical stiffness in comparison with other regions of the connection element, and
   a holding device for holding the connection elements, wherein:
   the connection elements are arranged beside one another in a first row and a second row, an upper side of the second row is arranged opposite to an underside of the first row, and the adjacent battery cells are connectable to one another alternately in the first row and the second row,
   the holding device comprises electrically insulating support elements, and the connection elements are produced from two main bodies formed as strips or as elongated metal sheets connected to the support elements, wherein
   the support elements include a first support element, which is connected to an upper side of each of the connection elements in the first row,
   the support elements include a second support element, which is connected to an underside of each of the connection elements in the first row and to the upper side of each of the connection elements in the second row, and
   the support elements include a third support element, which is connected to the underside of each of the connection elements in the second row.

9. A battery module for a vehicle, the battery module comprising:
   the cell-contacting system according to claim 8; and
   a plurality of battery cells, which are connected electrically to one another by the connection elements of the cell-contacting system.

* * * * *